United States Patent
Ye et al.

(10) Patent No.: US 11,295,168 B2
(45) Date of Patent: Apr. 5, 2022

(54) DEPTH ESTIMATION AND COLOR CORRECTION METHOD FOR MONOCULAR UNDERWATER IMAGES BASED ON DEEP NEURAL NETWORK

(71) Applicant: DALIAN UNIVERSITY OF TECHNOLOGY, Liaoning (CN)

(72) Inventors: Xinchen Ye, Liaoning (CN); Rui Xu, Liaoning (CN); Xin Fan, Liaoning (CN)

(73) Assignee: Dalian University of Technology, Liaoning (CN)

( * ) Notice: Subject to any disclaimer, the term of this patent is extended or adjusted under 35 U.S.C. 154(b) by 0 days.

(21) Appl. No.: 17/112,499

(22) Filed: Dec. 4, 2020

(65) Prior Publication Data

US 2021/0390339 A1    Dec. 16, 2021

(30) Foreign Application Priority Data

Jun. 15, 2020    (CN) .......................... 202010541535.5

(51) Int. Cl.
*G06K 9/62* (2022.01)
*G06T 7/55* (2017.01)
*H04N 1/60* (2006.01)

(52) U.S. Cl.
CPC ......... *G06K 9/6256* (2013.01); *G06K 9/6232* (2013.01); *G06T 7/55* (2017.01); *H04N 1/60* (2013.01); *G06T 2207/20081* (2013.01); *G06T 2207/20084* (2013.01)

(58) Field of Classification Search
CPC ................ G06K 9/6232; G06K 9/6256; G06T 2207/20081
See application file for complete search history.

(56) References Cited

PUBLICATIONS

N. Li, Z. Zheng, S. Zhang, Z. Yu, H. Zheng and B. Zheng, "The Synthesis of Unpaired Underwater Images Using a Multistyle Generative Adversarial Network," in IEEE Access, vol. 6, pp. 54241-54257, 2018, doi: 10.1109/ACCESS.2018.2870854. (Year: 2018).*

(Continued)

*Primary Examiner* — Ross Varndell
(74) *Attorney, Agent, or Firm* — Muncy, Geissler, Olds & Lowe, P.C.

(57) ABSTRACT

The invention discloses a depth estimation and color correction method for monocular underwater images based on deep neural network, which belongs to the field of image processing and computer vision. The framework consists of two parts: style transfer subnetwork and task subnetwork. The style transfer subnetwork is constructed based on generative adversarial network, which is used to transfer the apparent information of underwater images to land images and obtain abundant and effective synthetic labeled data, while the task subnetwork combines the underwater depth estimation and color correction tasks with the stack network structure, carries out collaborative learning to improve their respective accuracies, and reduces the gap between the synthetic underwater image and the real underwater image through the domain adaptation strategy, so as to improve the network's ability to process the real underwater image.

4 Claims, 4 Drawing Sheets

(56) References Cited

PUBLICATIONS

P. Liu, G. Wang, H. Qi, C. Zhang, H. Zheng and Z. Yu, "Underwater Image Enhancement With a Deep Residual Framework," in IEEE Access, vol. 7, pp. 94614-94629, 2019, doi: 10.1109/ACCESS.2019.2928976. (Year: 2019).*

X. Ye et al., "Deep Joint Depth Estimation and Color Correction From Monocular Underwater Images Based on Unsupervised Adaptation Networks," in IEEE Transactions on Circuits and Systems for Video Technology, vol. 30, No. 11, pp. 3995-4008, Nov. 2020, doi: 10.1109/TCSVT.2019.2958950. (Year: 2020).*

I. J. Goodfellow, J. Pouget-Abadie, M. Mirza, B. Xu, D. Warde-Farley, S. Ozair, A. Courville, Y. Bengio, "Generative Adversarial Nets", in NIPS, 2014, pp. 2672-2680; (pp. 9).

O. Ronneberger, P. Fischer, and T. Brox, "U-net: Convolutional networks for Biomedical Image segmentation", in MICCAI, 2015, pp. 234-241; (pp. 8).

N. Silberman, D. Hoiem, P. Kohli, and R. Fergus, "Indoor segmentation and support inference from rgbd images", in ECCV, 2012, pp. 746-760; (pp. 15).

G. Huang, Z. Liu, L. V. D. Maaten, and K. Q. Weinberger, "Densely connected convolutional networks", in IEEE CVPR, 2017, pp. 2261-2269; (pp. 9).

L. C. Chen, G. Papandreou, I. Kokkinos, K. Murphy, and A. L. Yuille, "Deeplab: Semantic image segmentation with deep convolutional nets, atrous convolution, and fully connected crfs, " IEEE TPAMI, vol. PP, No. 99, pp. 1-1, 2017; (pp. 15).

Q. Chen, J. Xu, and V. Koltun, "Fast image processing with fully convolutional networks", in IEEE ICCV, Oct. 2017, pp. 2516-2525; (pp. 10).

C. O. Ancuti, C. Ancuti, V. C. De, and P. Bekaert, "Color balance and fusion for underwater image enhancement," IEEE TIP, vol. 27, No. 1, pp. 379-393, 2018; (pp. 15).

C. Li, J. Guo, and C. Guo, "Emerging from water: Underwater image color correction based on weakly supervised color transfer", IEEE Signal Processing Letters, vol. 25, No. 3, pp. 323-327, 2018; (pp. 5).

P. Isola, J. Zhu, T. Zhou, and A. A. Efros, "Image-to-image translation with conditional adversarial networks", in IEEE CVPR, Jul. 2017, pp. 5967-5976; (pp. 24).

I. Laina, C. Rupprecht, V. Belagiannis, F. Tombari, and N. Navab, "Deeper depth prediction with fully convolutional residual networks", in Fourth International Conference on 3d Vision, 2016, pp. 239-248; (pp. 10).

* cited by examiner

DEPTH ESTIMATION AND COLOR CORRECTION METHOD FOR MONOCULAR UNDERWATER IMAGES BASED ON DEEP NEURAL NETWORK

TECHNICAL FIELD

The invention belongs to the field of image processing and computer vision, and specifically relates to a monocular underwater image depth estimation and color correction method based on deep neural network.

BACKGROUND

Depth estimation and color correction of underwater images are important basics for underwater operations, e.g., underwater monitoring, robot operation, underwater visual navigation, and so on. However, underwater depth estimation and color correction have been challenged by poor visibility and geometric distortion in underwater environment, making them more difficult to handle compared with the land environment. Particles and bubbles in seawater cause visible light to scatter and weaken in the process of propagation, resulting in the color deviation of the collected images. For depth estimation, stereo matching technology and other professional depth sensing devices are mainly used to obtain depth information. For inferring the depth information, stereo matching technique uses two corresponding images collected by binocular camera for correlation matching and triangulation measurement. Other depth acquisition methods mostly use depth sensing devices, such as Time-of-Flight (TOF) cameras, Microsoft Kinect cameras, and so on. Although these methods have achieved good results in the land environment, the results are unsatisfactory in the underwater environment due to imaging limitations and optical distortion. With the development of deep learning, the use of deep convolution neural network can directly obtain the corresponding depth information from single color image on land, which solves the limitation of the imaging related in traditional methods, but there are still problems: compared to the land, datasets with valid labels of underwater images are very scarce, resulting in the unavailable of depth maps and color-corrected images from practical underwater scene, and yet most existing methods need effective supervision information, e.g., depth map, for training, and then build a more accurate depth estimation network.

Based on the above problems, the invention designs a monocular underwater image depth estimation and color correction framework based on deep neural network, which simultaneously completes two underwater related tasks. The framework consists of two parts: style transfer subnetwork and task subnetwork. The style transfer subnetwork is constructed based on Generative Adversarial Networks (I. J. Goodfellow, J. Pouget-Abadie, M. Mirza, B. Xu, D. Warde-Farley, S. Ozair, A. Courville, and Y. Bengio, "Generative Adversarial Nets", in NIPS, 2014, PP. 2672-2680). It is used to transfer the apparent information of underwater images to land images and obtain rich and effective synthetic labeled data. The task subnetwork combines depth estimation and color correction of underwater images to improve their respective accuracies through collaborative learning.

SUMMARY

The present invention aims to overcome the shortcomings of existing technologies and provides a high-quality depth estimation and color correction method based on image style transfer subnetwork and task subnetwork, then designs a framework for high quality depth estimation and color correction based on deep neural network. The framework comprises two parts: style transfer subnetwork and task subnetwork. The style transfer subnetwork is constructed based on generative adversarial network, which is used to transfer the apparent information of underwater images to land images and obtain abundant and effective synthetic labeled data, while the task subnetwork combines the underwater depth estimation and color correction tasks with the stack network structure, carries out collaborative learning to improve their respective accuracies, and reduces the gap between the synthetic underwater image and the real underwater image through the domain adaptation strategy, so as to improve the network's ability to process the real underwater image.

The specific technical solution of the invention is, a method for high-quality depth estimation and color correction based on style transfer network and task network, the method comprises the following steps:

(1) Preparing initial data: The initial data is the land labeled dataset, including the land color map and the corresponding depth map for training; In addition, a small number of real underwater color images are collected to assist the training and testing;

(2) The construction of the style transfer subnetwork;

(2-1) The style transfer subnetwork is constructed based on generative adversarial network model, in which the generator uses the U-Net structure (O. Ronneberger, P. Fischer, and T. Brox, "U-net: Convolutional networks for Biomedical Image segmentation", in MICCAI, 2015, PP. 234-241.), which is composed of an encoder and a decoder.

(2-2) The discriminator consists of three parts. The first part is a module composed of Cony and Leaky Rectified Linear unit (Leaky ReLU). The second part is three modules composed of Cony, BN and Leaky ReLU. The third part is a sigmoid function layer that is used to output the test results.

(2-3) The style loss function and the content loss function are used to preserve the content and transform the style, and the total loss function of the whole style transfer subnetwork is constructed.

(3) The construction of the task subnetwork;

(3-1) Depth estimation and color correction are separately realized by using two generative adversarial networks, in which the structure of generator and discriminator is the same as that of generator and discriminator in style transfer subnetwork. On this basis, the depth estimation generator and color correction generator are connected in series to form a stacked network structure.

(3-2) Two discriminators are used to realize the domain adaptation between the synthetic underwater image and the real underwater image, and to enhance the network's ability to process the real underwater image, so as to solve the domain adaptation problem at the feature level.

(3-3) Construct the total loss function of the entire task subnetwork.

(4) Training the whole network composed by (2) and (3).

(4-1) First of all, the land labeled data and underwater real data are used to train the style transfer subnetwork, and then a convergent training model is obtained, so as to obtain effective synthetic underwater labeled data.

(4-2) Then, the synthetic underwater labeled dataset obtained by style transfer subnetwork is used to train the task subnetwork. Real underwater images are simultaneously added to train together, so as to reduce the difference between real underwater domain and synthetic underwater domain and improve the network's ability to process real underwater images.

(4-3) The two networks are connected in series according to the order of style transfer subnetwork and task subnetwork, and the total loss function is used for unified training and fine-tuning the whole network framework. When the training is completed, the trained model can be used for testing on the test set to obtain the output result of the corresponding input image.

The present invention has the following beneficial effects:

The present invention is based on a deep neural network, which firstly builds a style transfer subnetwork based on generative adversarial network to obtain effective synthetic labeled data, and then builds a task subnetwork to realize depth estimation and color correction. It has the following characteristics:

1. The system is easy to build, and the deep neural network can be used to get the corresponding high-quality depth map and color-corrected underwater image from the single underwater color image in an end-to-end fashion.

2. The algorithm is simple and easy to be implemented.

3. This method makes the network have sufficient data to learn depth estimation and color correction through transferring the apparent information of underwater images to land images.

4. It adopts the feature domain adaptation method, which can effectively reduce the gap between the two domains of land images and underwater images.

DETAILED DESCRIPTION

Figure 1:
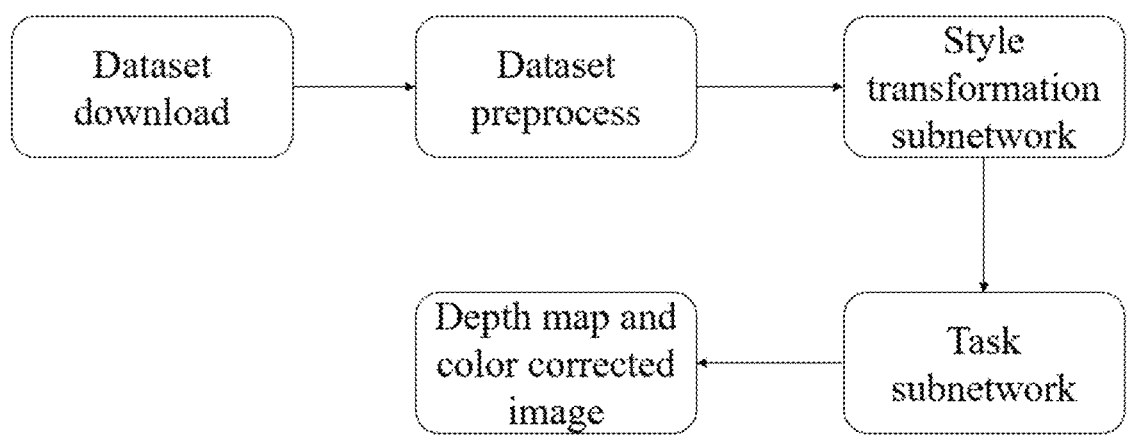
FIG. 1 is the actual flow chart.

Specific embodiment of the present invention is further described below in combination with accompanying drawings and the technical solution:

A method for depth estimation and color correction from monocular underwater images based on deep neural network, as shown in FIG. 1, which includes the following steps:

(1) Preparing initial data;

(1-1) Three representative real underwater datasets are used, including two video datasets (R. Liu, X. Fan, M. Zhu, M. Hou, and Z. Luo, "Real-world underwater enhancement: Challenges, benchmarks, and solutions," arXiv preprint arXiv: 1901.05320, 2019) and one image dataset (C. Li, C. Guo, W. Ren, R. Cong, J. Hou, S. Kwong, and D. Tao, "An underwater image enhancement benchmark dataset and beyond", arXiv preprint arXiv: 1901.05495, 2019). The videos in the two video datasets are split to obtain about 500 frames of real underwater images. The latter image dataset contains about 100 images.

(1-2) Using NYU RGB-D v2 dataset (N. Silberman, D. Hoiem, P. Kohli, and R. Fergus, "Indoor segmentation and support inference from rgbd images", in ECCV, 2012, pp. 746-760) as the land dataset of this invention, which contains 1449 land color images and their corresponding. This invention uses 795 image pairs for training and 654 for testing.

(2) The construction of the style transfer subnetwork;

(2-1) The style transfer subnetwork is constructed based on the generative adversarial network model, in which the generator uses U-Net structure (O. Ronneberger, P. Fischer, and T. Brox, "U-net: Convolutional networks for biomedical image segmentation", in MICCAI, 2015, pp. 234-241.) and the encoder is composed of four similar modules, each module containing a dense connection layer (G. Huang, Z. Liu, L. V. D. Maaten, and K. Q. Weinberger, "Densely connected convolutional networks", in IEEE CVPR, 2017, pp. 2261-2269.) and a transition layer. The dense connection layer is composed of three dense blocks, and the transition layer is composed of batch standardization (BN), Rectified Linear unit (ReLU), convolution (Cony) and average pooling. The decoder is composed of four symmetric modules, each of which is a combination of deconvolution (DConv), BN and ReLU. In order to obtain multi-scale information, the invention adds a multi-scale module at the end of the whole generator structure (L. C. Chen, G. Papandreou, I. Kokkinos, K. Murphy, and A. L. Yuille, "Deeplab: Semantic image segmentation with deep convolutional nets, atrous convolution, and fully connected crfs," IEEE TPAMI, vol. PP, no. 99, pp. 1-1, 2017.).

(2-2) The discriminator consists of three parts. The first part is a module composed of Cony and Leaky Rectified Linear unit (Leaky ReLU). The second part is three modules composed of Cony, BN and Leaky ReLU. The third part is a sigmoid function layer that is used to output the test results.

(2-3) The style loss function and the content loss function are used to preserve the content and transform the style. The formula of the style loss function $L_{sty}$ is shown as follows:

$$L_{sty} = \sum_{l \in L_s} \|\mathbb{G}^l(x_t) - \mathbb{G}^l(G_s(y_s, d_s))\|_2^2$$

in which, $G_s$ represents the generator, $L_s$ represents all the layers that need to be paid attention to in the style loss function, $\mathbb{G}^l$ represents the style representation of the l layer, $x_t$ represents the real image, $y_s$ represents the land color image, $d_s$ represents the corresponding depth map, and $\|\bullet\|_2^2$ represents the square of L2 norm.

Content loss function $L_{con}$ is shown as follows:

$$L_{con} = \sum_{l \in L_c} \|\phi^l(y_s) - \phi^l(G_s(y_s, d_s))\|_2^2$$

in which, $L_c$ represents all the layers that need to be paid attention to in the content loss function, $\varnothing^l$ represents the feature map of the l layer.

Thus, the total loss function $L_{sAN}$ of the entire style transfer subnetwork is:

$$L_{SAN}=L_{adv_s}+\lambda_a L_{sty}+\lambda_b L_{con}$$

in which, $L_{adv_s}$ represents the generative adversarial loss function of the style transfer subnetwork part, which is a common loss function in the generative adversarial network. $\lambda_a$ and $\lambda_b$ represent the weight parameters, both of which have the value as 1.

(3) The construction of the task subnetwork;

(3-1) Depth estimation and color correction are separately realized by using two generative adversarial networks, in which the structure of generator and discriminator is the same as that of generator and discriminator in style transfer subnetwork. On this basis, the depth estimation generator and color correction generator are connected in series to form a stacked network structure.

(3-2) Two discriminators are used to realize the domain adaptation between the synthetic underwater image and the real underwater image, which can enhance the network's ability to process the real underwater image, so as to solve the domain adaptation problem at the feature level. The structure of the domain adaptive discriminator is the same as that of the discriminator in (3-1). Each discriminator has a special loss function to solve the domain adaptation at the feature level. The formula is shown as follows:

$$L_{fd}=\mathbb{E}_{f_{x_t}\sim f x_t}[\log D_{fd}(f_{x_t})]+\mathbb{E}_{f_{x_s}\sim f x_s}[\log(1-D_{fd}(f_{x_s}))]$$

in which, $L_{fd}$ represents the domain discriminant loss function of depth estimation task, $D_{fd}$ represents the discriminator of depth estimation task, $\mathbb{E}$ represents expectation, f represents the feature map obtained from the last translation layer of generator, $x_t$ represents real underwater images, $x_s$ represents synthetic images, $X_t$ represents real underwater images dataset, $X_s$ represents synthetic image dataset, $f_{x_t}$ represents the feature map of $x_t$, $f_{x_s}$ represents the feature map of $x_s$, $\mathbb{E}_{f_{x_t}\sim f x_t}$ represents the expectation that satisfies with the domain $X_t$, $\mathbb{E}_{f_{x_s}\sim f x_s}$ represents the expectation that satisfies with the domain $X_s$.

The formula of the domain discriminant loss function of color correction task is as follows:

$$L_{fc}=\mathbb{E}_{f_{x_t}\sim f x_t}[\log D_{fc}(f_{x_t})]+\mathbb{E}_{f_{x_s}\sim f x_s}[\log(1-D_{fc}(f_{x_s}))]$$

in which, $L_{fc}$ represents the domain discriminant loss function of color correction task, $D_{fc}$ represents the discriminator of color correction task.

(3-3) Constructing the total loss function of the entire task subnetwork;

First, the task loss function is designed to make the predicted image approximate to the actual image and promote correct regression. The formula is as follows:

$$L_t=\|d_s-G_d(x_s)\|_1+\|y_s-G_c(G_d(x_s))\|_1$$

in which, $L_t$ represents the required loss function, $G_d$ and $G_c$ represent the generators for depth estimation and color correction respectively, $x_s$ represents the synthesized underwater data, $d_s$ represents the actual depth map corresponding to the synthesized underwater data, $y_s$ represents the actual land image corresponding to the synthesized underwater data, $\|\cdot\|_1$ represents the L1 norms.

Figure 2:
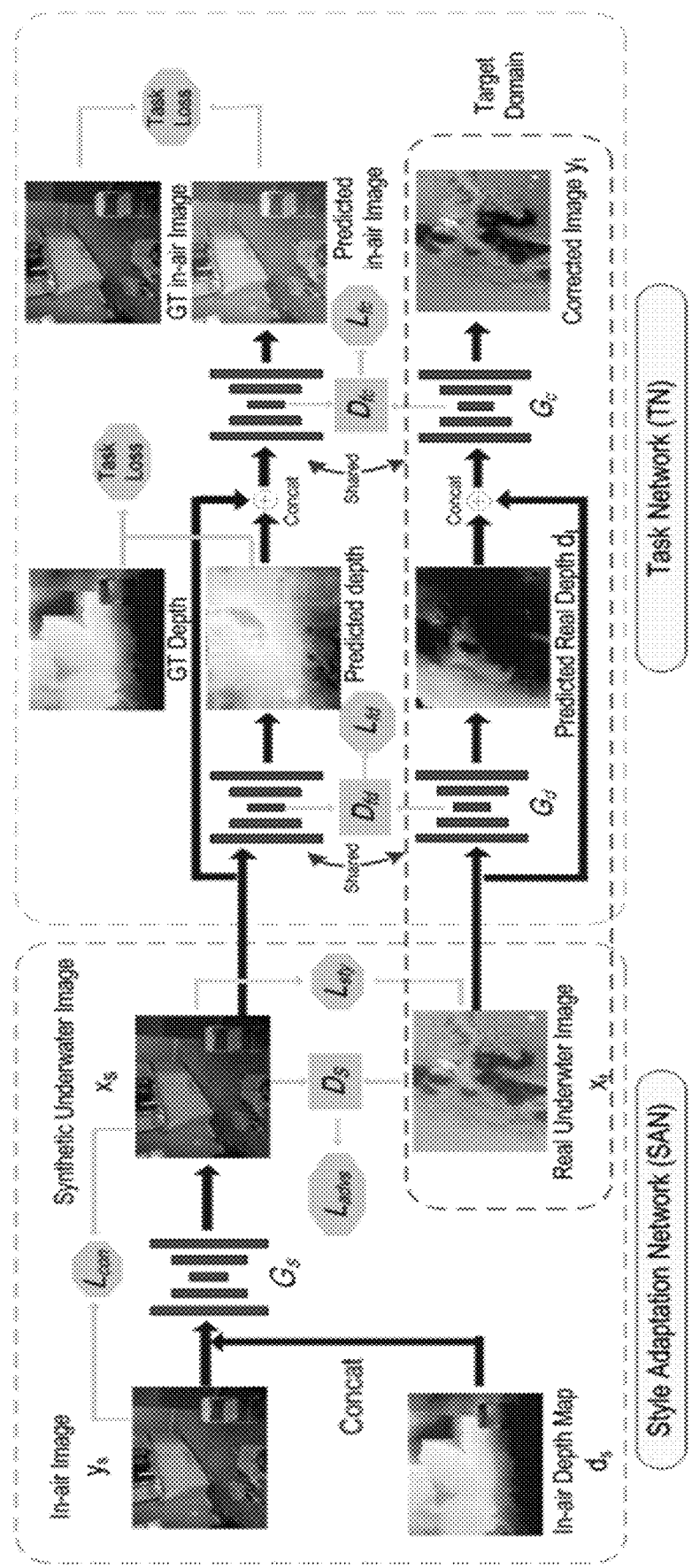
FIG. 2 is a schematic diagram of the network structure. In which, $L_{con}$ is Content loss function; $G_s$ is a generator in the style transfer subnetwork; $L_{adv_s}$ is the generative adversarial loss function of the style transfer subnetwork part; $D_s$ is the discriminator in the style transfer subnetwork; $L_{sty}$ is the style loss function; $D_{fd}$ is a domain adaptive discriminator for depth estimation in task subnetworks; $L_{fd}$ is a domain discriminant loss function of depth estimation task in task subnetwork; $G_d$ is the depth estimation generator in the task subnetwork; $D_{fc}$ is represents the domain adaptive discriminator of color correction in task subnetwork; $L_{fc}$ is the domain discrimination loss of color correction task in task subnetwork; $G_c$ is a color correction generator in task subnetwork.

Thus, the total loss of the entire task network is $L_{TN}$:

$$L_{TN}=L_{adv_d}+L_{adv_c}+\lambda_t L_t+\lambda_d L_{fd}+\lambda_c L_{fc}$$

in which, $L_{adv_d}$ and $L_{adv_c}$ represent the generation adversarial losses of depth estimation and color correction parts, respectively, which are common losses in the generation adversarial network; $\lambda_t$, $\lambda_d$ and $\lambda_c$ represent balance coefficients, with values of 10, 0.1 and 0.1, respectively. The entire network structure is shown in FIG. 2.

(4) Training the whole network composed by (2) and (3).

(4-1) First, the land paired data (NYU RGB-D V2) and underwater real data are used to train the style transfer subnetwork, and a convergent training model is obtained, so as to obtain effective synthetic underwater labeled dataset.

(4-2) Then, the synthetic underwater labeled dataset obtained by style transfer subnetwork is used to train the task subnetwork, and real underwater images are simultaneously added to train together, so as to reduce the difference between real underwater domain and synthetic underwater domain and improve the network's ability to process real underwater images.

(4-3) The two networks are connected in series according to the order of style transfer subnetwork and task subnetwork, and the total loss function L is used to train and fine-tune the whole network framework. The equation is shown as follows:

$$L=L_{SAN}+L_{TN}$$

During the training, the momentum parameter is set as 0.9. The learning rate is initialized to 2e-4 and decreases by 0.9 in each epoch. When the training is completed, the trained model can be used for testing on the test set to obtain the output result of the corresponding input image.

Figure 3:
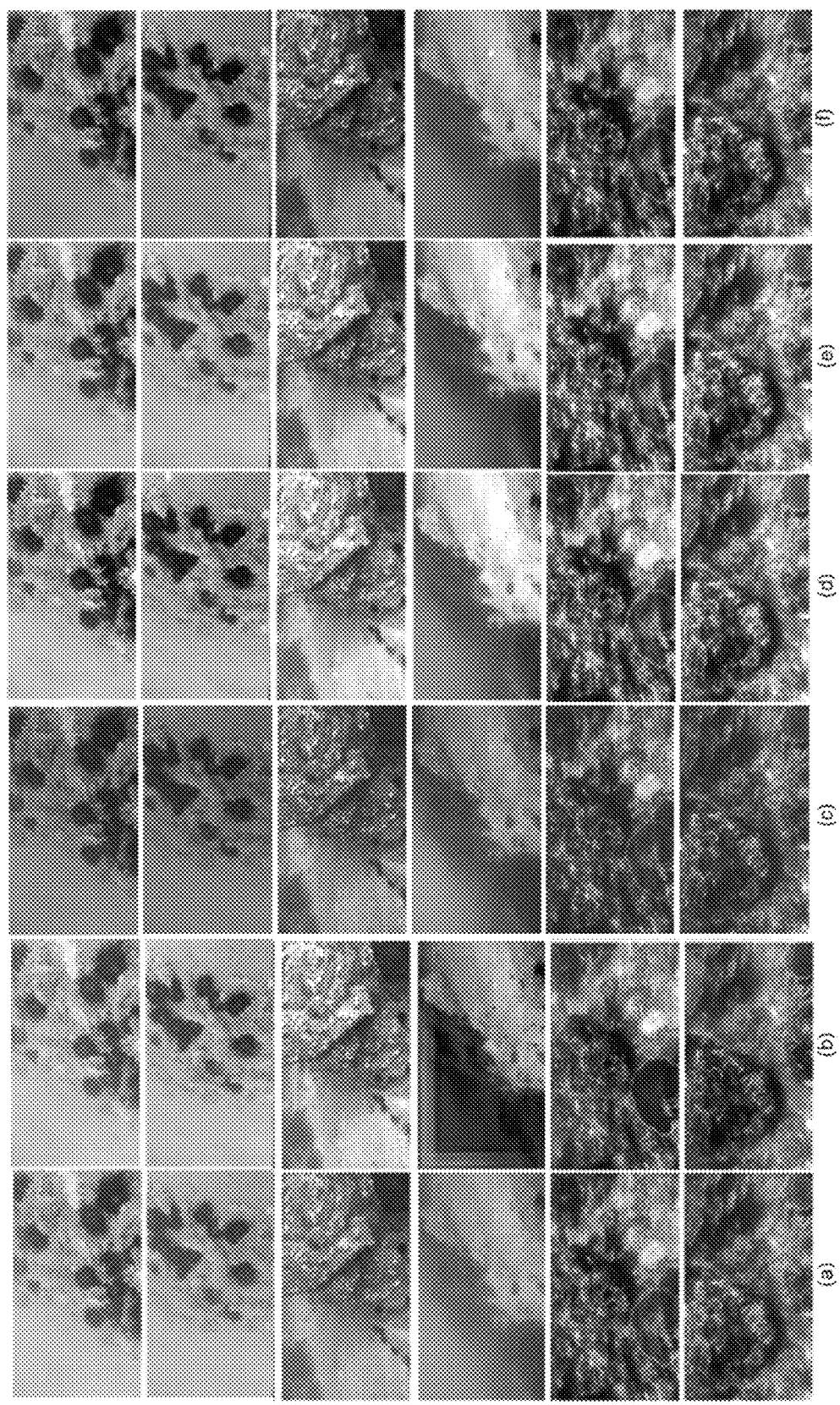
FIG. 3 is the results of color correction compared with other methods. (a) Different underwater image; (b) FIP method; (c) CBF method; (d) R-cycle method; (e) Pix2Pix method; (f) Results of the present invention.

The comparison results of color correction with other methods are shown in FIG. 3: (a) Different real underwater images; (b) FIP method (Q. Chen, J. Xu, and V. Koltun, "Fast image processing with fully convolutional networks", in IEEE ICCV, October 2017, pp. 2516-2525); (c) CBF method (C. O. Ancuti, C. Ancuti, V. C. De, and P. Bekaert, "Color balance and fusion for underwater image enhancement, "IEEE TIP, vol. 27, no. 1, pp. 379-393, 2018); (d) R-cycle method (C. Li, J. Guo, and C. Guo, "Emerging from water: Underwater image color correction based on weakly supervised color transfer", IEEE Signal Processing Letters, vol. 25, no. 3, pp. 323-327, 2018); (e) Pix2Pix method (P. Isola, J. Zhu, T. Zhou, and A. A. Efros, "Image-to-image translation with conditional adversarial networks", in IEEE CVPR, July 2017, pp. 5967-5976); (f) Results of the present invention.

Figure 4:
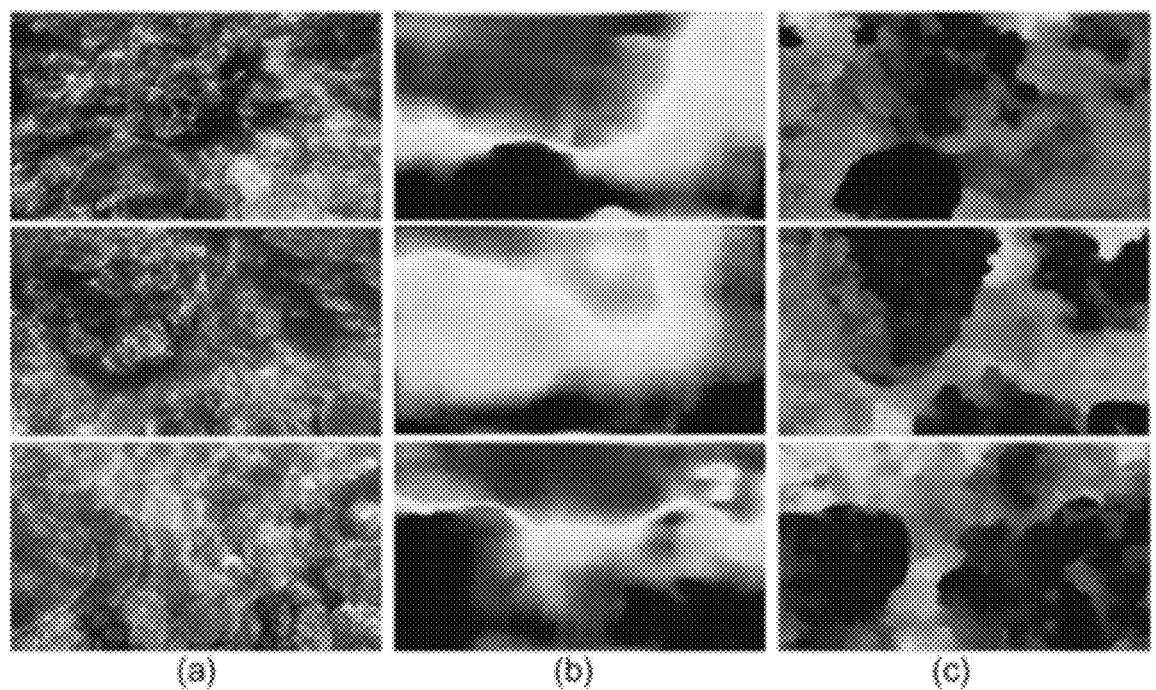
FIG. 4 is the results of depth estimation compared with other methods. (a) Different underwater image; (b) Laina method; (c) Results of the present invention.

The comparison results of depth estimation with other methods are shown in FIG. 4: (a) Different real underwater images; (b) Laina method (I. Laina, C. Rupprecht, V. Belagiannis, F. Tombari, and N. Navab, "Deeper depth prediction with fully convolutional residual networks", in Fourth International Conference on 3*d* Vision, 2016, pp. 239-248); (c) Results of the present invention.

The results show that we get the best results in both depth estimation and color correction tasks.

The invention claimed is:

1. A method for depth estimation and color correction of monocular underwater images based on deep neural network, wherein the method comprises the following steps:
   (1) preparing initial data: the initial data is a land labeled dataset, including a land color map and a corresponding depth map for training; in addition, a small number of real underwater color images are collected to assist the training and testing;
   (2) constructing a style transfer subnetwork;
   (2-1) the style transfer subnetwork is constructed based on generative adversarial network model, in which the generator uses a U-Net structure, which is composed of an encoder and a decoder;

(2-2) a discriminator consists of three parts; the first part is a module composed of conventional (Conv) and Leaky Rectified Linear unit (ReLU); the second part is three modules composed of Conv, batch standardization (BN) and Leaky ReLU; the third part is a sigmoid function layer that is used to output test results;

(2-3) a style loss function and a content loss function are used to preserve a content and transform a style of an input image, and a total loss function of a whole style transfer subnetwork is constructed;

(3) constructing a task subnetwork;

(3-1) depth estimation and color correction are separately realized by using two generative adversarial networks, in which the structure of a generator and a discriminator are the same as that of generator and discriminator in the style transfer subnetwork; on this basis, the depth estimation generator and color correction generator are connected in series to form a stacked network structure;

(3-2) adapting the domain between the synthetic underwater image and the real underwater image using two discriminators;

(3-3) constructing the total loss function of the entire task subnetwork;

(4) training the whole network composed by (2) and (3);

(4-1) the land labeled data and underwater real data are used to train the style transfer subnetwork, and then a convergent training model is obtained, so as to obtain effective synthetic underwater labeled data;

(4-2) the synthetic underwater labeled dataset obtained by the style transfer subnetwork is used to train the task subnetwork; real underwater images are simultaneously added to train together, so as to reduce a difference between real underwater domain and synthetic underwater domain and improve the deep neural network's ability to process real underwater images;

(4-3) the two generative adversarial networks are connected in series according to the order of the style transfer subnetwork and task subnetwork, and the total loss function is used for unified training and fine-tuning the whole network framework; when the training is completed, the trained model can be used for testing on the test set to obtain an output result of the corresponding input image.

2. The method for depth estimation and color correction of monocular underwater images based on deep neural network according to claim 1, wherein the construction of style transfer subnetwork includes the following steps:

(2-1) the style transfer subnetwork is constructed based on the generative adversarial network model, in which the generator uses U-Net structure and the encoder is composed of four similar modules, each module containing a dense connection layer and a transition layer; the dense connection layer is composed of three dense blocks, and the transition layer is composed of batch standardization, ReLU, convolution and average pooling; the decoder is composed of four symmetric modules, each of which is a combination of deconvolution, BN and ReLU;

(2-2) the style loss function and the content loss function are used to preserve the content and transform the style; the formula of the style loss function $L_{sty}$ is shown as follows:

$$L_{sty} = \sum_{l \in L_s} \|\mathbb{G}^l(x_t) - \mathbb{G}^l(G_s(y_s, d_s))\|_2^2$$

in which, $G_s$ represents the generator, $L_s$ represents all the layers that need to be paid attention to in the style loss function, $\mathbb{G}^l$ represents the style representation of the l layer, $x_t$ represents the real image, $y_s$ represents the land color image, $d_s$ represents the corresponding depth map, and $\|\bullet\|_2^2$ represents the square of L2 norm;

content loss function $L_{con}$ is shown as follows:

$$L_{con} = \sum_{l \in L_c} \|\varnothing^l(y_s) - \varnothing^l(G_s(y_s, d_s))\|_2^2$$

in which, $L_c$ represents all the layers that need to be paid attention to in the content loss function, $\varnothing^l$ represents the feature map of the l layer;

thus, the total loss function $L_{SAN}$ of the entire style transfer subnetwork is:

$$L_{SAN} = L_{adv_s} + \lambda_a L_{sty} + \lambda_b L_{con}$$

in which, $L_{adv_s}$ represents the generative adversarial loss function of the style transfer subnetwork part, which is a common loss function in the generative adversarial network; $\lambda_a$ and $\lambda_b$ represent the weight parameters, both of which have the value as 1.

3. The method for depth estimation and color correction of monocular underwater images based on deep neural network according to claim 2, wherein, in step (2-1), in order to obtain multi-scale information, a multi-scale module is added to the structure of the U-net structured generator at the end.

4. The method for depth estimation and color correction of monocular underwater images based on deep neural network according to claim 1, wherein the construction of task subnetwork includes the following steps:

(3-1) two discriminators are used to realize the domain adaptation between the synthetic underwater image and the real underwater image, which can enhance the network's ability to process the real underwater image, so as to solve the domain adaptation problem at the feature level; the structure of the domain adaptive discriminator is the same as that of the discriminator; each discriminator has a special loss function to solve the domain adaptation at the feature level; the formula is shown as follows:

$$L_{fd} = \mathbb{E}_{f_{x_t} \sim f_{x_t}}[\log D_{fd}(f_{x_t})] + \mathbb{E}_{f_{x_s} \sim f_{x_s}}[\log(1 - D_{fd}(f_{x_s}))]$$

in which, $L_{fd}$ represents the domain discriminant loss function of depth estimation task, $D_{fd}$ represents the discriminator of depth estimation task, $\mathbb{E}$ represents expectation, f represents the feature map obtained from the last translation layer of generator, $x_t$ represents real underwater images, $x_s$ represents synthetic images, $X_t$ represents real underwater images dataset, $X_s$ represents synthetic image dataset, $f_{x_t}$ represents the feature map of $x_t$, $f_{x_s}$ represents the feature map of $x_s$, $\mathbb{E}_{f_{x_t} \sim f_{x_t}}$ represents the expectation that satisfies with the domain $X_t$, $\mathbb{E}_{f_{x_s} \sim f_{x_s}}$ represents the expectation that satisfies with the domain $X_s$;

the formula of the domain discriminant loss function of color correction task is as follows:

$$L_{fc} = \mathbb{E}_{f_{x_t} \sim f_{x_t}}[\log D_{fc}(f_{x_t})] + \mathbb{E}_{f_{x_s} \sim f_{x_s}}[\log(1 - D_{fc}(f_{x_s}))]$$

in which, $L_{fc}$ represents the domain discriminant loss function of color correction task, $D_{fc}$ represents the discriminator of color correction task.

(3-2) constructing the total loss function of the entire task subnetwork;

the task loss function is designed to make the predicted image approximate to the actual image and promote correct regression; the formula is as follows:

$$L_t = \|d_s - G_d(x_s)\|_1 + \|y_s - G_c(G_d(x_s))\|_1$$

in which, $L_t$ represents the required loss function, $G_d$ and $G_c$ represent the generators for depth estimation and color correction respectively, $x_s$ represents the synthesized underwater data, $d_s$ represents the actual depth map corresponding to the synthesized underwater data, $y_s$ represents the actual land image corresponding to the synthesized underwater data, $\|\cdot\|_1$ represents the L1 norms;

the total loss of the entire task network is $L_{TN}$:

$$L_{TN} = L_{adv_d} + L_{adv_c} + \lambda_t L_t + \lambda_d L_{fd} + \lambda_c L_{fc}$$

in which, $L_{adv_d}$ and $L_{adv_c}$ represent the generation adversarial losses of depth estimation and color correction parts, respectively, which are common losses in the generation adversarial network; $\lambda_t$, $\lambda_d$ and $\lambda_c$ represent balance coefficients, with values of 10, 0.1 and 0.1, respectively.

\* \* \* \* \*